2 Sheets. Sheet 1.

J. W. Fowle,

Rock-Drilling Machine.

No. 2,275. Reissued June 5, 1866.

AM. PHOTO-LITHO. CO. N.Y. (OSBORNE'S PROCESS)

2 Sheets-Sheet 2.

J. W. Fowle,

Rock-Drilling Machine.

No. 2,275. Reissued June 5, 1866.

AM. PHOTO-LITHO. CO. N.Y. (OSBORNE'S PROCESS)

UNITED STATES PATENT OFFICE.

JOSEPH W. FOWLE, OF BOSTON, MASSACHUSETTS.

IMPROVED STEAM DRILLING-MACHINE.

Specification forming part of Letters Patent No. 7,972, dated March 11, 1851; extended seven years; Reissue No. 2,275, dated June 5, 1866.

*To all whom it may concern:*

Be it known that I, JOSEPH W. FOWLE, of Boston, in the county of Suffolk and State of Massachusetts, have invented an Improved Drilling-Engine; and I do hereby declare that the following, taken in connection with the drawings which accompany and form part of this specification, is a description of my invention sufficient to enable those skilled in the art to practice it.

My invention relates to the construction of drilling-engines, the main feature of the invention consisting in attaching the drill or drill-shaft directly to the piston of the steam-cylinder, or to an elongation thereof, or to the cross-head of the engine, whereby the direct pressure of the motor is employed to drive the drill, such drill so mounted having a rotary movement imparted to it, and, if necessary, a progressive feed-movement. Steam or other similar motive power may be used to drive the piston, as circumstances may render advisable.

Figure 1:
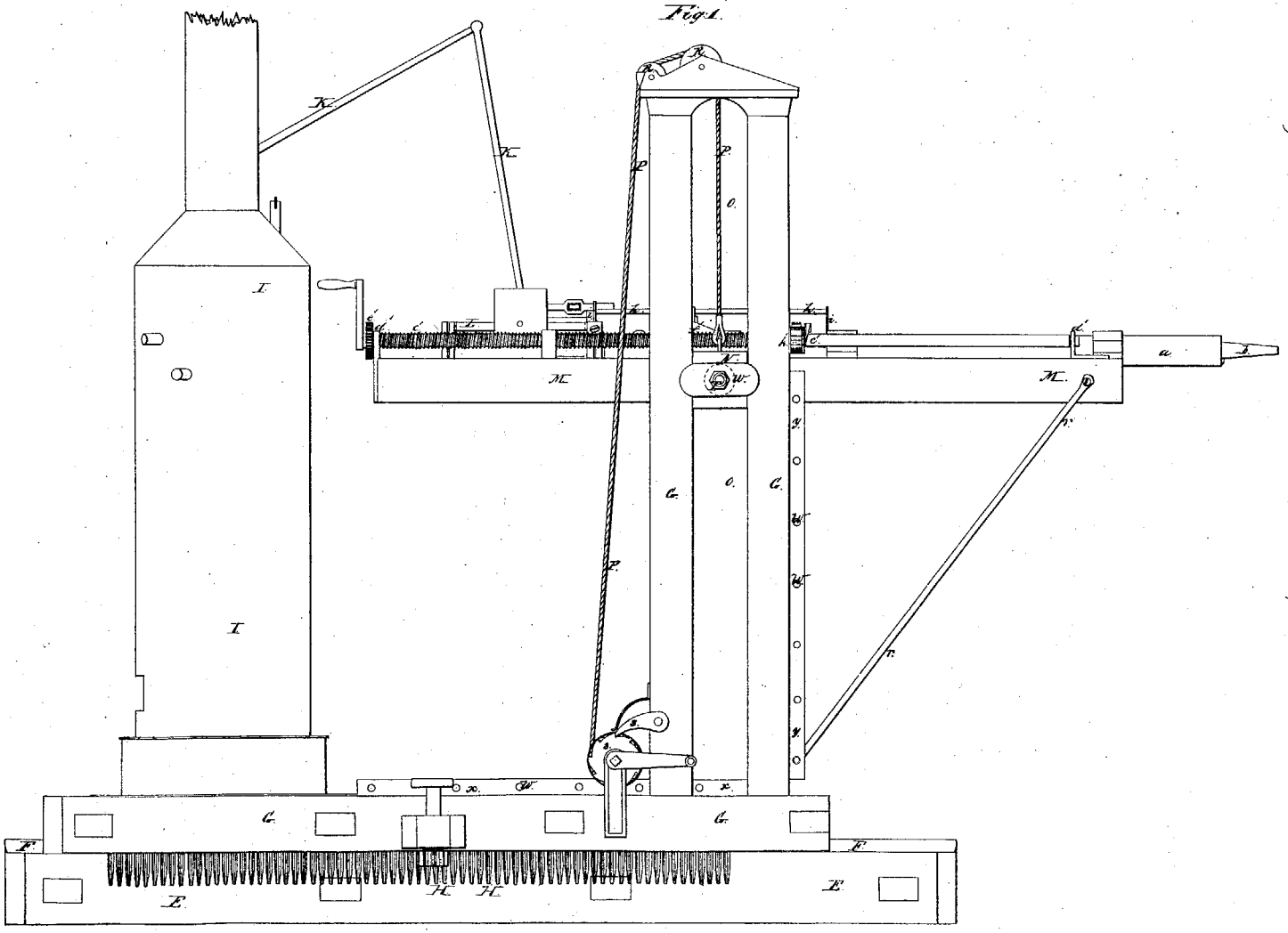
Figures 2, 3, 4:
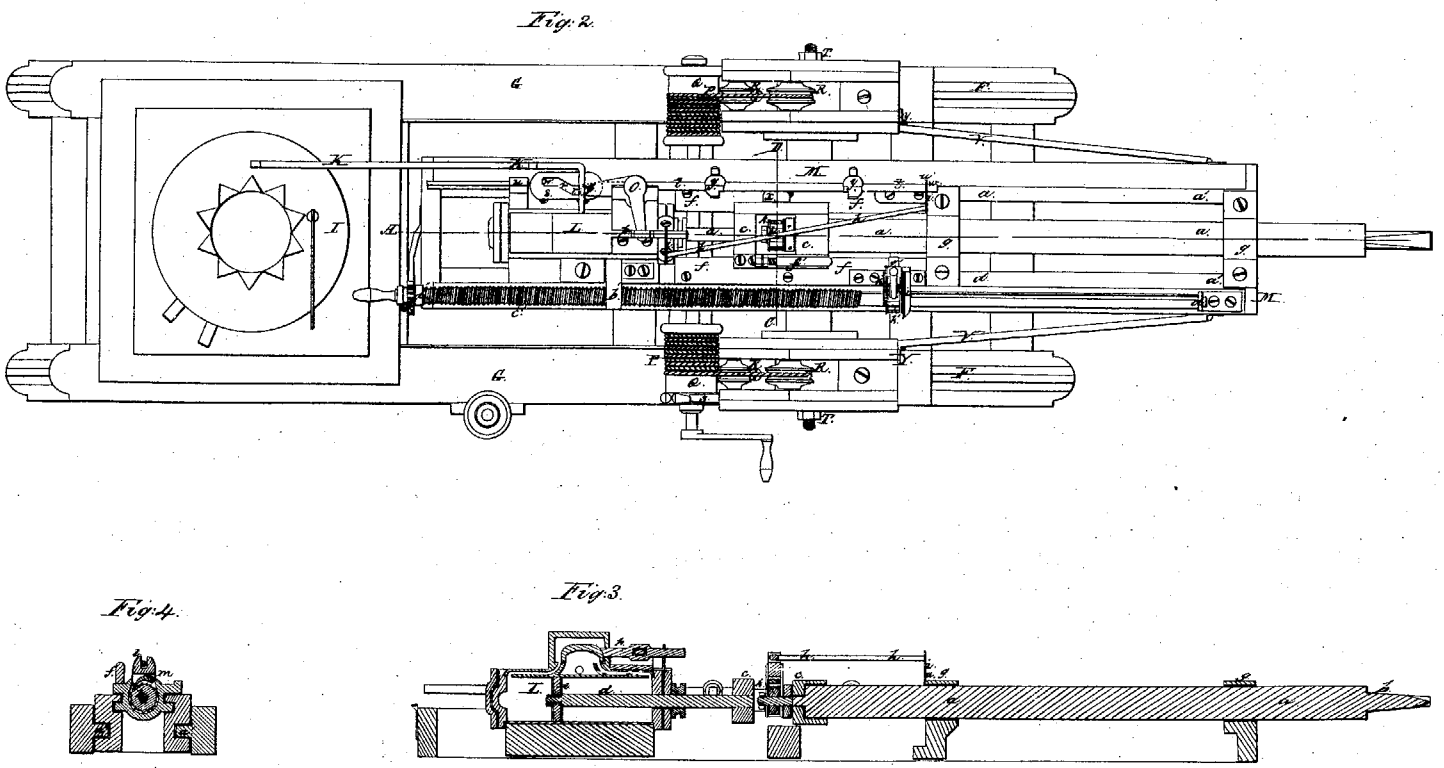

A machine embodying these improvements is represented in the drawings, Figure 1 being a side elevation, and Fig. 2 a plan, of the same. Fig. 3 is a longitudinal vertical section taken on the line A B, Fig. 2, and Fig. 4 a vertical cross-section taken on the line C D, Fig. 2.

E denotes a bed-frame supporting a carriage, G, which is moved over guide rails or ways F on the frame E by the rack and pinion shown at H H, or in any other suitable manner. In this carriage are mounted the steam-cylinder and drill mechanism.

A steam-boiler, I, is shown as placed on the rear end of the carriage, steam from which is conveyed to the engine-cylinder L through a jointed or yielding pipe, K.

The drill-shaft *a*, carrying the drill *b* at its outer end, is attached to or connected directly with the cross-head *c* of the piston-rod *d* of the cylinder L, or directly to the piston-rod itself, and so as to be in or nearly in line with or an elongation of said piston-rod, by which arrangement it will be obvious that the entire pressure of the steam acting on the piston *e* will be exerted to impel the drill forward.

The cross-head slides to and fro on guides *f* in the usual way, and the cylinder and its appurtenances are shown as mounted in a movable frame, M, so hung in standards upon the frame G as to be capable of vertical swinging movement.

The frame is hung or supported in sliding boxes N, which move up and down in openings O in the standards. The boxes are shown as suspended at the ends of cords P, which pass over pulleys R and to a windlass, Q, by means of which the frame M may be raised and lowered, as will be readily understood, said windlass being provided with a ratchet and pawl, S, and the frame M being confined at any desired height by means of nuts and screws T, working in connection with confining-buttons U.

The frame M is secured at any desirable inclination by means of rods V, fastened at one end to the frame M and at the other at any suitable position along the length of horizontal and vertical plates X or Y, provided with holes W, into which the bent ends of the rods V fit, or with any other suitable means for confining the lower ends of the rods to the frame G. By these methods of adjustment the drill is supported and worked at any desirable height and inclination with respect to the surface upon which it operates.

The drill-shaft is moved forward and backward in boxes *g*, and in connection with this longitudinal movement said shaft has an intermittent rotary movement to turn the operating-face of the drill, this movement being effected as follows:

A diagonal rod, *h*, is fastened to projection *i* from the guideways *f*. A ratchet-wheel, *k*, is permanently fastened to the inner end of the drill-shaft, and a pawl-holder, *l*, rocking upon the shaft, extends upward and has a fork at its upper end, which embraces the diagonal rod *h*. This holder carries a pawl, *m*, which engages with the teeth of the ratchet. As the drill-shaft moves forward the pawl-holder is swung in one direction by the rod *h*, the pawl slipping over the teeth of the ratchet; but as the drill moves back the holder is swung back with the pawl in engagement with the ratchet, turning the ratchet and the drill a sufficient distance to give the drill-face a different angle of presentation to the surface, against which it operates at each successive blow.

As the successive blows of the drill reduce the stone against which it operates a progressive movement is imparted to the drill-shaft, this movement being effected as follows: The drill-and-cylinder mechanism is mounted upon an auxiliary carriage, which moves forward and back upon ways $a'$ on the frame M. A nut, $b'$, fastened upon this carriage fits upon the thread of a rotary screw-shaft, $c'$, turning in bearings $d'$ on the frame M. Rotation of this screw-shaft imparts a longitudinal movement to the nut $b'$, and thereby imparts a similar movement to the drill and its impelling mechanism. This rotary movement is intermittently and automatically effected by the forward movement of the drill-shaft. For this purpose an incline, $f'$, is attached to the cross-head $c$, which, as said cross-head moves forward, presses against the end $g'$ of a pawl-holder, $h'$, whereby a pawl, $i$, moving with said holder, engages with the teeth of a ratchet, $k'$, fixed on the screw-shaft $c'$, and rotates the shaft to an extent accordingly to the distance the pawl-holder is moved, which distance, of course, corresponds to the amount of forward movement of the incline. If the surface of the stone be very hard, the piston will progress by its momentum only sufficient to cause a very slight impingement of the incline against the pawl-holder, and, of course, the screw-shaft will be correspondingly slightly turned, and the cross-head have a very slight progressive forward movement. If, on the contrary, the surface be soft, the extent of forward movement of the cross-head will cause the incline to lift the pawl-holder to its full extent, and the consequent rotation of the screw-shaft will carry the cross-head and drill forward progressively and to the maximum extent at each blow of the drill.

The danger of driving the piston through the heads of the cylinder by reason of using the direct action of the steam in driving the drill is obviated by the arrangement for operating the rocker-shaft and shifting the valve of the engine just immediately preceding each stroke of the drill, or before the piston comes close to either end of the cylinder. The rocker-shaft $o$ has two arms nearly at right angles to each other. (Shown in Fig. 2, Plate 2.) At the end of one of its arms it is secured to the valve-rod $p$, and at the other it has a small pin or stud, $q$, which fits into and is moved or operated upon by the diagonal slot $r$ in the plate $s$, attached to one end of the sliding rod $t$, which rod moves forward and back in proper guides at $u$, attached to the drill-carriage. From each end of this diagonal slot $r$ a horizontal slot, or one parallel to the axis of the cylinder L, extends toward the front and rear of the said cylinder, as shown at $v$ and $w$ in Fig. 2, Plate 2. The rod $t$ is moved forward and back by means of a stud, $x$, on the cross-head $c$, which, as said cross-head moves forward and back, abuts against the adjustable tappets $y$, secured on said rod at proper points, so as to shift the valve at the proper time, as hereinabove suggested. Now, when the stone is soft, if the momentum which the piston has acquired would have a tendency to carry the cross-head farther along than the usual length of stroke, or than would be sufficient to open the valve to a proper degree, the horizontal slots at $v$ and $w$ (after the diagonal slot $r$ has shifted the valve) only slide on the pin or stud $q$ of the rocker, and have no further effect upon the valve.

I claim—

In a drilling-engine in which the drill has an intermittent rotary movement or a progressive feed movement, or both a rotary and feed movement, the attachment of the drill directly to the cross-head of the engine, or to the piston or an elongation therefrom, in such manner that the drill is driven by the direct pressure of the motor upon the piston.

In witness whereof I have hereunto set my hand this 11th day of August, A. D. 1865.

JOSEPH W. FOWLE.

Witnesses:

J. B. CROSBY,

W. B. GLEASON.